United States Patent
Potter

(10) Patent No.: US 6,422,087 B1
(45) Date of Patent: Jul. 23, 2002

(54) ELECTRONIC CONTROL SYSTEM FOR A VARIABLE SUPPORT MECHANISM

(75) Inventor: Jerry L. Potter, Pinebluff, NC (US)

(73) Assignee: Rostra Precision Controls, Inc., Laurinburg, NC (US)

( * ) Notice: Subject to any disclaimer, the term of this patent is extended or adjusted under 35 U.S.C. 154(b) by 0 days.

(21) Appl. No.: 09/352,077

(22) Filed: Jul. 14, 1999

Related U.S. Application Data
(60) Provisional application No. 60/092,849, filed on Jul. 15, 1998, provisional application No. 60/092,851, filed on Jul. 15, 1998, provisional application No. 60/092,852, filed on Jul. 15, 1998, provisional application No. 60/092,856, filed on Jul. 15, 1998, provisional application No. 60/092,858, filed on Jul. 15, 1998, and provisional application No. 60/092,858, filed on Jul. 15, 1998.

(51) Int. Cl.$^7$ .................................................. G01L 7/02
(52) U.S. Cl. ............................................ 73/731; 701/49
(58) Field of Search ............................ 73/731, 729.2; 701/45–49, 36; 280/711–714, 707, 683, 772, 689, 735, 734, 730.1; 297/284.4, 284.6; 340/438, 666, 667, 665; 180/273, 282, 268, 271; 307/10.1, 10.6

(56) References Cited

U.S. PATENT DOCUMENTS 3,924,613 A   12/1975   Beck .......................... 125/24 R
4,467,426 A    8/1984   Hida et al. ................... 364/424

(List continued on next page.)

*Primary Examiner*—Benjamin R. Fuller
*Assistant Examiner*—Abdullahi Aw-Musse
(74) *Attorney, Agent, or Firm*—MacMillan, Sobanski & Todd, LLC

(57) ABSTRACT

A variable support mechanism includes a plurality of pneumatic bladders and an electronic control system for controlling the inflation and deflation thereof. Each of the bladders communicates through a valve with a common manifold. The operations of the valves are individually controlled by a microprocessor. A pressure sensor communicates with the manifold and generates electrical signals that are representative of the magnitude of the fluid pressure in the manifold to the microprocessor. The microprocessor is also connected to a vent valve that provides selective fluid communication between the manifold and the atmosphere. The microprocessor is further connected to a pressure valve that provides selective fluid communication between the manifold and a pump. Initially, the magnitude of the pressure in each of the bladders is sampled, measured, and stored by the electronic control system. Then, the measured pressure readings from the bladders are compared with respective target values and, in response to that comparison, are designated as being either (1) Too Low, (2) Too High, or (3) Within Limits. The bladders that have been identified as being Too Low are inflated until they have achieved their respective target values, and the bladders that have been identified as being Too High are deflated until they have achieved their respective target values. The electronic control system identifies the user of the vehicular seat assembly and, in response thereto, customizes the operation of one or more controlled devices in the vehicle. Lastly, the electronic control system is placed an inactive mode, wherein no action occurs for a predetermined length of time. When the predetermined length of time expires, the algorithm branches back to the first routine discussed above, wherein this cycle is repeated.

8 Claims, 8 Drawing Sheets

U.S. PATENT DOCUMENTS

| | | |
|---|---|---|
| 4,516,788 A | 5/1985 | Umetsu et al. ............. 280/6 R |
| 4,634,179 A | 1/1987 | Hashimoto et al. ......... 297/284 |
| 4,655,505 A | 4/1987 | Kashiwamura et al. ..... 297/284 |
| 4,722,550 A | 2/1988 | Imaoka ...................... 280/727 |
| 4,833,614 A | 5/1989 | Saitoh et al. .......... 364/424.05 |
| 5,127,708 A | 7/1992 | Kishi et al. ............. 297/284 R |
| 5,129,704 A | 7/1992 | Kishi et al. ............. 297/284 R |
| 5,155,685 A | 10/1992 | Kishi et al. ............ 364/424.05 |
| 5,170,364 A | 12/1992 | Gross et al. ................ 364/558 |
| 5,263,765 A | 11/1993 | Nagashima et al. ..... 297/284.6 |
| 5,283,735 A | 2/1994 | Gross et al. ........... 364/413.02 |
| 5,320,409 A | 6/1994 | Katoh et al. ............. 297/284.6 |
| 5,375,880 A * | 12/1994 | Fleener et al. .............. 280/772 |
| 5,558,398 A | 9/1996 | Santos ..................... 297/284.3 |
| 5,637,076 A | 6/1997 | Hazard et al. ................. 601/5 |
| 6,088,642 A * | 7/2000 | Finkelsrein et al. .......... 701/49 |
| 6,088,643 A * | 7/2000 | Long et al. .................... 701/49 |
| 6,098,000 A * | 8/2000 | Long et al. .................... 701/49 |
| 6,101,436 A * | 8/2000 | Fortune et al. ................ 701/45 |

* cited by examiner

ELECTRONIC CONTROL SYSTEM FOR A VARIABLE SUPPORT MECHANISM

CROSS REFERENCE TO RELATED APPLICATIONS

This application claims the benefit of United States Provisional Application Nos. 60/092,849, filed Jul. 15, 1998; 60/092,851, filed Jul. 15, 1998; 60/092,852, filed Jul. 15, 1998; 60/092,854, filed Jul. 15, 1998; 60/092,856, filed Jul. 15, 1998; and 60/092,858, filed Jul. 15, 1998. The disclosures of those provisional applications are incorporated herein by reference.

BACKGROUND OF THE INVENTION

This invention relates in general to support mechanisms, such as seats or beds, upon which some or all of a human body can be comfortably supported. More specifically, this invention relates to an improved structure for a variable support mechanism including a plurality of pneumatic bladders and an electronic control system for controlling the inflation and deflation of such bladders so as to comfortably support the body of a person on a support surface.

Generally speaking, a support mechanism is a device that includes a support surface adapted to engage and provide support for some or all of a human body. In a fixed support mechanism, the support surface is generally fixed in size and shape, deforming only as a result of forces being applied thereto. A wide variety of fixed support mechanisms are known in the art, including conventional seats and beds. However, a number of other fixed support mechanisms having support surfaces are known in the art, such as bandages, braces, and the like. It is known that when a portion of a human body contacts a support surface for an extended period of time, several undesirable effects can occur. These undesirable effects can range from minor muscle aches and fatigue to more severe discomforts. In the past, the solution to this problem involved human intervention to vary the position of the body of the person relative to the support surface.

More recently, a variety of support mechanisms have been developed having support surfaces that can be varied in shape or size provide an increased level of comfort to the person supported thereon. Such variable support mechanisms are commonly found, for example, in vehicular seat assemblies. In such vehicular seat assemblies, it is known to provide a plurality of pneumatic bladders at predetermined locations so as to individually support the thigh, ischial, and lumbar regions of the user. The variable support mechanism in such a vehicular seat assembly further includes a pump and one or more valves for selectively increasing or decreasing the amount of air contained within each or all of the bladders. By selectively inflating and deflating these bladders, the shape and size of the support surface can be quickly and easily customized in accordance with the body shape of the user. Such a device has been found to significantly increase the overall comfort to the user.

In the past, inflation and deflation of the bladders were performed manually by the user. Typically, this was accomplished by providing one or more electrical switches that controlled the operations of the pump and the valves. By properly manipulating the switches, the user could cause the bladders to be inflated and deflated as desired. Although these systems were effective, they were reliant upon manual manipulation and control by the user to effect adjustments. More recently, electronic control systems have been incorporated into these variable support mechanisms to permit the inflation and deflation of the bladders to occur automatically in response to predetermined sensed conditions. However, the cost and complexity of known variable support mechanisms and their associated electronic control systems have been found to be relatively high. Thus, it would be desirable to provide an improved structure for a variable support mechanism including a plurality of pneumatic bladders and an electronic control system for controlling the inflation and deflation of such bladders so as to comfortably support the body of a person on a support surface.

SUMMARY OF THE INVENTION

This invention relates to an improved structure for a variable support mechanism including a plurality of pneumatic bladders and an electronic control system for controlling the inflation and deflation of such bladders so as to comfortably support the body of a person on a support surface. Each of the bladders communicates through a solenoid operated valve with a common manifold. The operations of the solenoid operated valves are individually controlled by a microprocessor. A pressure sensor communicates with the manifold and generates electrical signals that is representative of the magnitude of the fluid pressure in the manifold to the microprocessor. The microprocessor is also connected to a solenoid operated vent valve that provides selective fluid communication between the manifold and the atmosphere. The microprocessor is further connected to a solenoid operated pressure valve that provides selective fluid communication between the manifold and a pump. An algorithm for controlling the operation of the electronic control system begins with an initial routine wherein the magnitude of the pressure in each of the bladders is sampled, measured, and stored by the electronic control system. Then, the algorithm enters a second routine wherein the measured pressure readings from the bladders are compared with respective target values and, in response to that comparison, are designated as being either (1) Too Low, (2) Too High, or (3) Within Limits. In a third routine of the algorithm, the bladders that have been identified as being Too Low are inflated until they have achieved their respective target values. Similarly, in a fourth routine of the algorithm, the bladders that have been identified as being Too High are deflated until they have achieved their respective target values. In a fifth routine of the algorithm, the electronic control system identifies the user of the vehicular seat assembly and, in response thereto, customizes the operation of one or more controlled devices in the vehicle. In a final routine of the algorithm, the electronic control system is placed an inactive mode, wherein no action occurs for a predetermined length of time. When the predetermined length of time expires, the algorithm branches back to the first routine discussed above, wherein this cycle is repeated.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
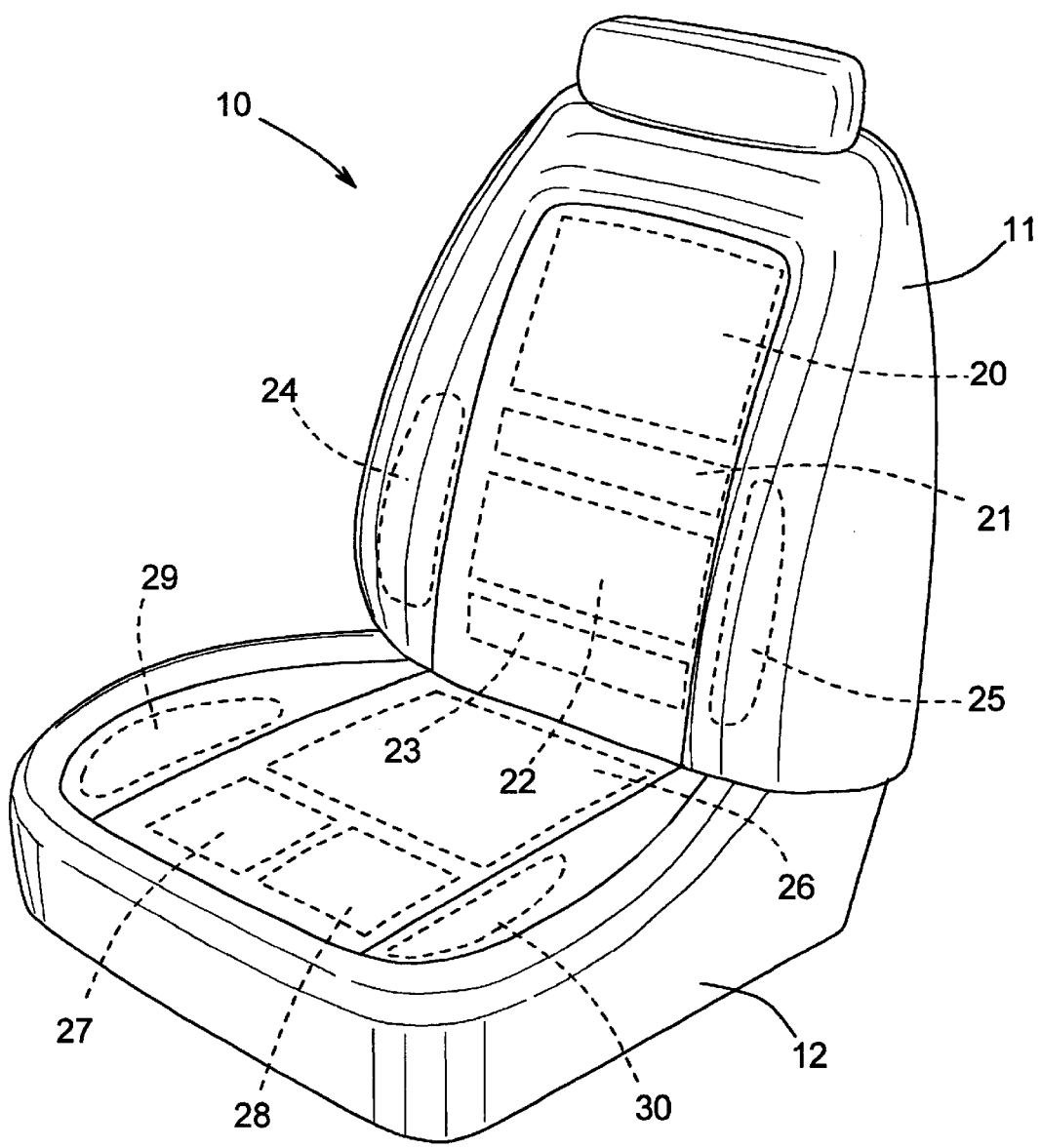
FIG. 1 is a perspective view of a vehicular seat assembly including a variable support mechanism and electronic control system in accordance with this invention.

Referring now to the drawings, there is illustrated in FIG. 1 a perspective view of a vehicular seat assembly, indicated generally at 10, including a variable support mechanism and electronic control system in accordance with this invention. Although this invention will be described in the context of the illustrated vehicular seat assembly 10, it will be appreciated that this invention may be used in conjunction with any known variable support mechanism. The seat assembly 10 includes a seat portion 11 and a back portion 12. A plurality of pneumatic bladders 20 through 30 are provided within the seat portion 11 and the back portion 12 of the seat assembly 10. In the illustrated embodiment, the bladder 20 is provide to support the upper back region of a user, the bladders 21, 22, and 23 are provided to support the central lumbar region of the user, the bladders 24 and 25 are provided to support the lateral lumbar regions of the user, the bladder 26 is provided to support the ischial region of the user, the bladders 27 and 28 are provided to support the central thigh regions of the user, and the bladders 29 and 30 are provided to support the lateral thigh regions of the user. This invention contemplates that a greater or lesser number of such bladders 20 through 30 may be provided in the support mechanism, and that the locations of such bladders 20 through 30 within the seat assembly 10 may be varied as desired. Although this invention will be described and illustrated in the context of pneumatic bladders 20 through 30, it will be appreciated that this invention may be practiced using other well known fluid operated actuators or similar structures.

Figure 2:
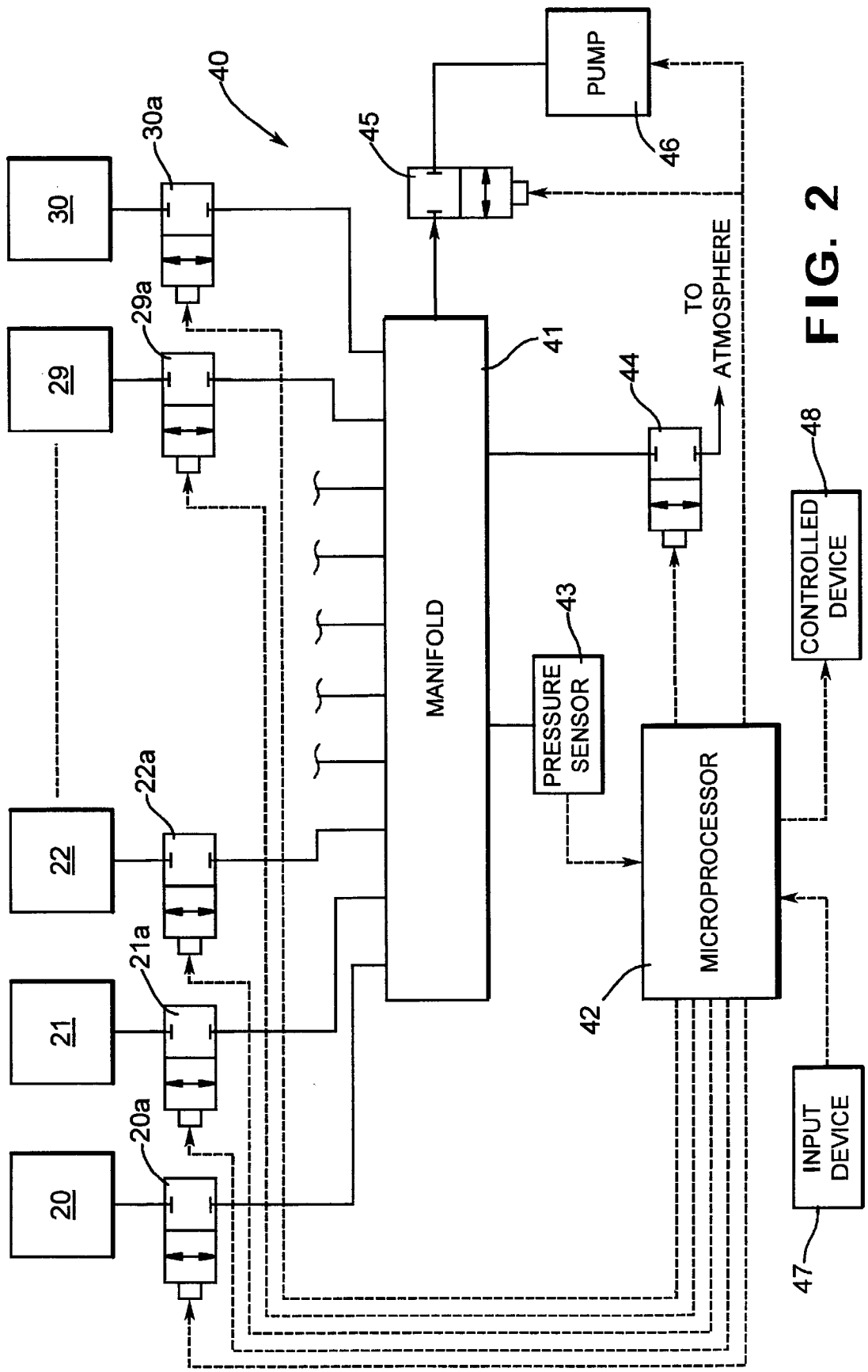
FIG. 2 is a schematic block diagram of an electronic control system for controlling the inflation and deflation of the variable support mechanism illustrated in FIG. 1.

FIG. 2 is a schematic block diagram of an electronic control system, indicated generally at 40, for automatically controlling the inflation and deflation of the bladders 20 through 30 so as to comfortably support the body of a person on the variable support mechanism provided in the seat assembly 10. For the sake of simplicity, not all of the bladder 20 through 30 are illustrated in FIG. 2. Nonetheless, it will be appreciated that the non-illustrated bladders can be structured and operated in the same manner as the illustrated bladders. Each of the bladders 20 through 30 communicates through a solenoid operated valve 20a through 30a, respectively, with a common manifold 41. Each of the solenoid operated valves 20a through 30a shown in FIG. 2 is illustrated in a closed position, wherein fluid communication is prevented between each of the bladders 20 through 30 and the manifold 41. However, each of the solenoid operated valves 20a through 30a can be moved to an opened position, wherein fluid communication is permitted between each of the bladders 20 through 30 and the manifold 41. If desired, the solenoid operated valves 20a through 30a can be connected mounted together in side-by-side fashion to function in the aggregate as the manifold 41.

The operations of the solenoid operated valves 20a through 30a are individually controlled by an electronic controller, such as a microprocessor 42. The microprocessor 42 is, of itself, conventional in the art and may be embodied as any general purpose control device that is responsive to one or more input signals for generating one or more output signals to control the operation of the electronic control system 40 in a desired manner. The manner of operation of the microprocessor 42 will be explained in detail below. A pressure sensor 43 communicates with the manifold 41 and is connected with the microprocessor 42. The pressure sensor 43 is conventional in the art and is adapted to generate an electrical signal that is representative of the magnitude of the fluid pressure in the manifold 41 to the microprocessor 42.

The microprocessor 42 is also connected to a solenoid operated vent valve 44. The vent valve 44 provides selective fluid communication between the manifold 41 and the atmosphere. The vent valve 44 shown in FIG. 2 is illustrated in a closed position, wherein fluid communication is prevented between the manifold 41 and the atmosphere. However, the vent valve 44 can be moved to an opened position, wherein fluid communication is permitted between the manifold 41 and the atmosphere.

The microprocessor 42 is further connected to a solenoid operated pressure valve 45. The pressure valve 45 provides selective fluid communication between the manifold 41 and a pump 46. The pressure valve 45 shown in FIG. 2 is illustrated in a closed position, wherein fluid communication is prevented between the manifold 41 and the pump 46. However, the pressure valve 45 can be moved to an opened position, wherein fluid communication is permitted between the manifold 41 and the pump 46. The operation of the pump 46 is also controlled by the microprocessor 42.

One or more input devices 47 may be connected to the microprocessor 42. The input device 47 is conventional in the art and may be embodied as any well known manually operable device, such as one or more switches, a keyboard, and the like. Generally speaking, the input device 47 is provided to allow a user to generate electrical signals to the microprocessor 42 to control the operation of the electronic control system 40 in a desired manner. Also, one or more conventional output devices (not shown) may be connected to the microprocessor 42 if desired. The output device may be provided to facilitate the use of the electronic control system 40 by the user.

Lastly, one or more controlled devices 48 may be connected to the microprocessor 42. The controlled device 48 may include any device that is capable of being adjusted in size, position, or mode of operation to a particular user of the vehicular seat assembly 10. For example, the controlled device 48 may be an air bag assembly that is adapted to be deployed in the event of a collision. As will be explained in greater detail below, the microprocessor 42 determines the identity of the user of the vehicular seat assembly 10 based upon measured pressure readings of the bladders 20 through 30. In response thereto, the microprocessor 42 generates signals to the controlled device 48 to customize the operation thereof in accordance with the identified user. For example, the rate of deployment of the air bag assembly may be varied in accordance with the size and weight of the user of the vehicular seat assembly 10. Other examples of controlled devices 48 include a seat track positioning mechanism (that adjusts the vehicular seat assembly 10 forwardly and rearwardly), a tilt mechanism for adjusting the position of the back portion 12 of the vehicular seat assembly 10 relative to the seat portion 11, radio station selections, climate controls and mirror positioning mechanisms. Communications between the microprocessor 42 and any or all of these controlled devices 48 can be accomplished in any conventional manner, such as by standard electronic bus lines provided in most modern vehicles.

Figure 3:
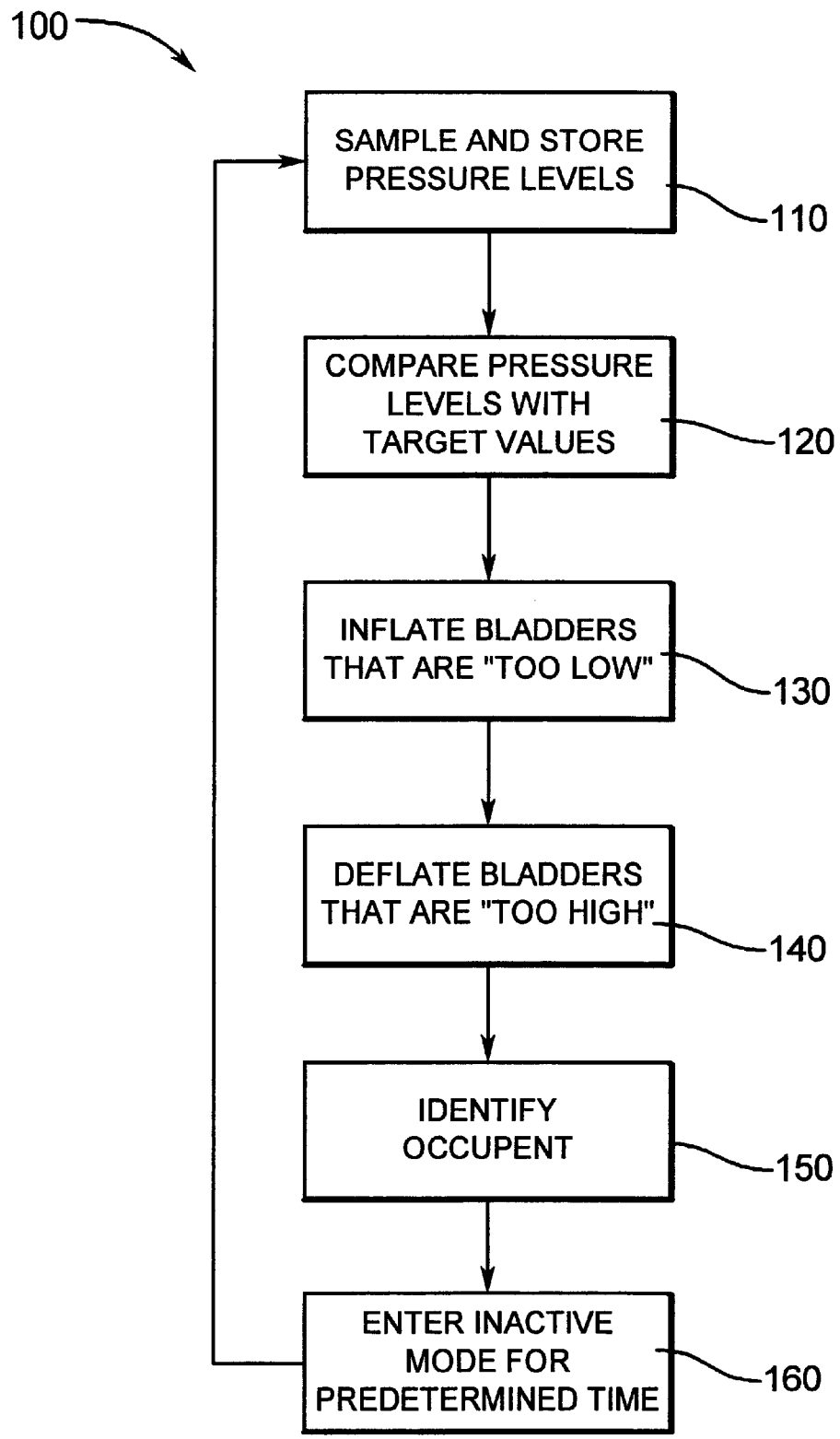
FIG. 3 is a simplified flow chart of an algorithm for controlling the operation of the electronic control system illustrated in FIG. 2.

FIG. 3 is a simplified flow chart of an algorithm, indicated generally at 100, for controlling the operation of the electronic control system 40 illustrated in FIG. 2. As shown therein, the algorithm 100 begins with an initial routine 110 wherein the magnitude of the pressure in each of the bladders 20 through 30 is sampled, measured, and stored by the electronic control system 40. Then, the algorithm 100 enters a second routine 120 wherein the measured pressure readings from the bladders 20 through 30 are compared with respective target values and, in response to that comparison, are designated as being either (1) Too Low, (2) Too High, or (3) Within Limits. In a third routine 130 of the algorithm 100, the bladders 20 through 30 that have been identified as being Too Low are inflated until they have achieved their respective target values. Similarly, in a fourth routine 140 of the algorithm 100, the bladders 20 through 30 that have been identified as being Too High are deflated until they have achieved their respective target values. The third and fourth routines 130 and 140 may be performed in reverse order or otherwise combined together if desired. In a fifth routine 150 of the algorithm 100, the electronic control system 40 identifies the user of the vehicular seat assembly 10 and, in response thereto, customizes the operation of one or more controlled devices in the vehicle. In a final routine 160 of the algorithm 100, the electronic control system 40 is placed an inactive mode, wherein no action occurs for a predetermined length of time. This predetermined length of time may be set as desired, such as for approximately two minutes. When the predetermined length of time expires, the algorithm 100 branches back to the first routine 110 discussed above, wherein this cycle is repeated.

Figure 4:
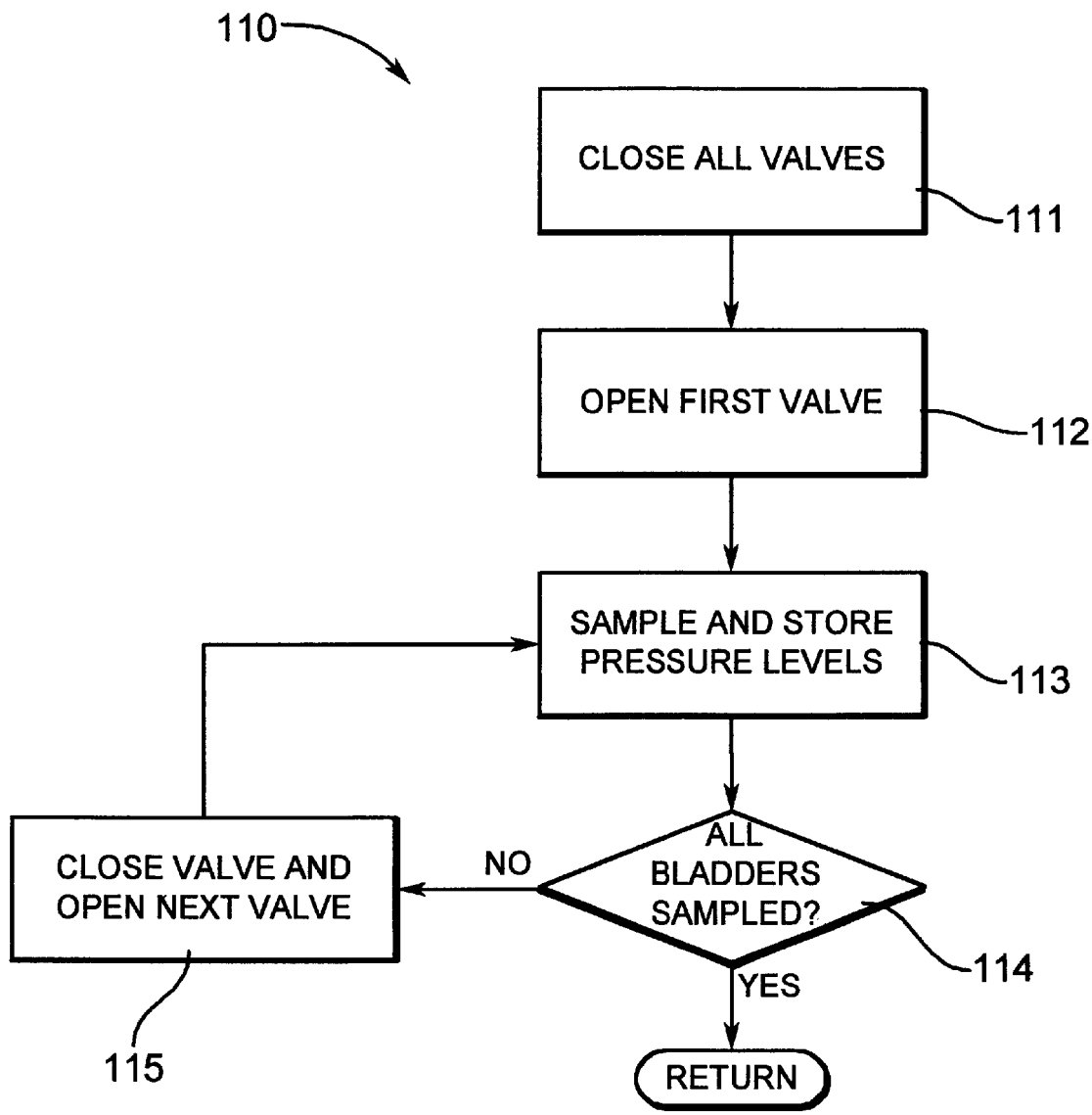
FIG. 4 is a detailed flow chart of the steps involved in a first routine of the algorithm illustrated in FIG. 3.

FIG. 4 is a detailed flow chart of the steps involved in the first routine 110 of the algorithm 100 illustrated in FIG. 3, wherein the magnitude of the pressure in each of the bladders 20 through 30 is sampled, measured, and stored by the electronic control system 20. In a first step 111 of the first routine 110, the microprocessor 42 causes the vent valve 44, the pressure valve 45, and each of the individual solenoid operated valves 20a through 30a to be closed or to remain closed. Next, the first routine 110 enters a step 112, wherein a first one of the solenoid operated valves 20a through 30a is opened such that the associated bladder 20 through 30 is placed in fluid communication with the manifold 41. When this occurs, the pressure of the fluid contained within the manifold 41 becomes equal with the pressure of the fluid contained within the associated bladder 20. The first routine 110 then enters a step 113, wherein the pressure in the manifold 41 and the associated bladder 20 (as measured by the pressure sensor 43) is sampled by and stored in the microprocessor 42. Thereafter, the first routine 110 enters a step 114 wherein it is determined whether the pressure levels of all of the bladders 20 through 30 have been sampled and stored. If not, the first routine 110 enters a step 115 wherein the microprocessor 42 causes the opened first one of the individual solenoid operated valves 20a through 30a to be closed, and further causes the next one of the individual solenoid operated valves 20a through 30a to be opened. The first routine 110 then branches back to the step 113 wherein the pressure in the manifold 41 and the associated bladder 20 (as measured by the pressure sensor 43) is sampled by and stored in the microprocessor 42. This process is repeated until the pressure levels of all of the bladders 20a through 30a have been sampled and stored. When this occurs, the first routine 110 returns from the step 114 to the algorithm 110 and enters the second routine 120.

Figure 5:
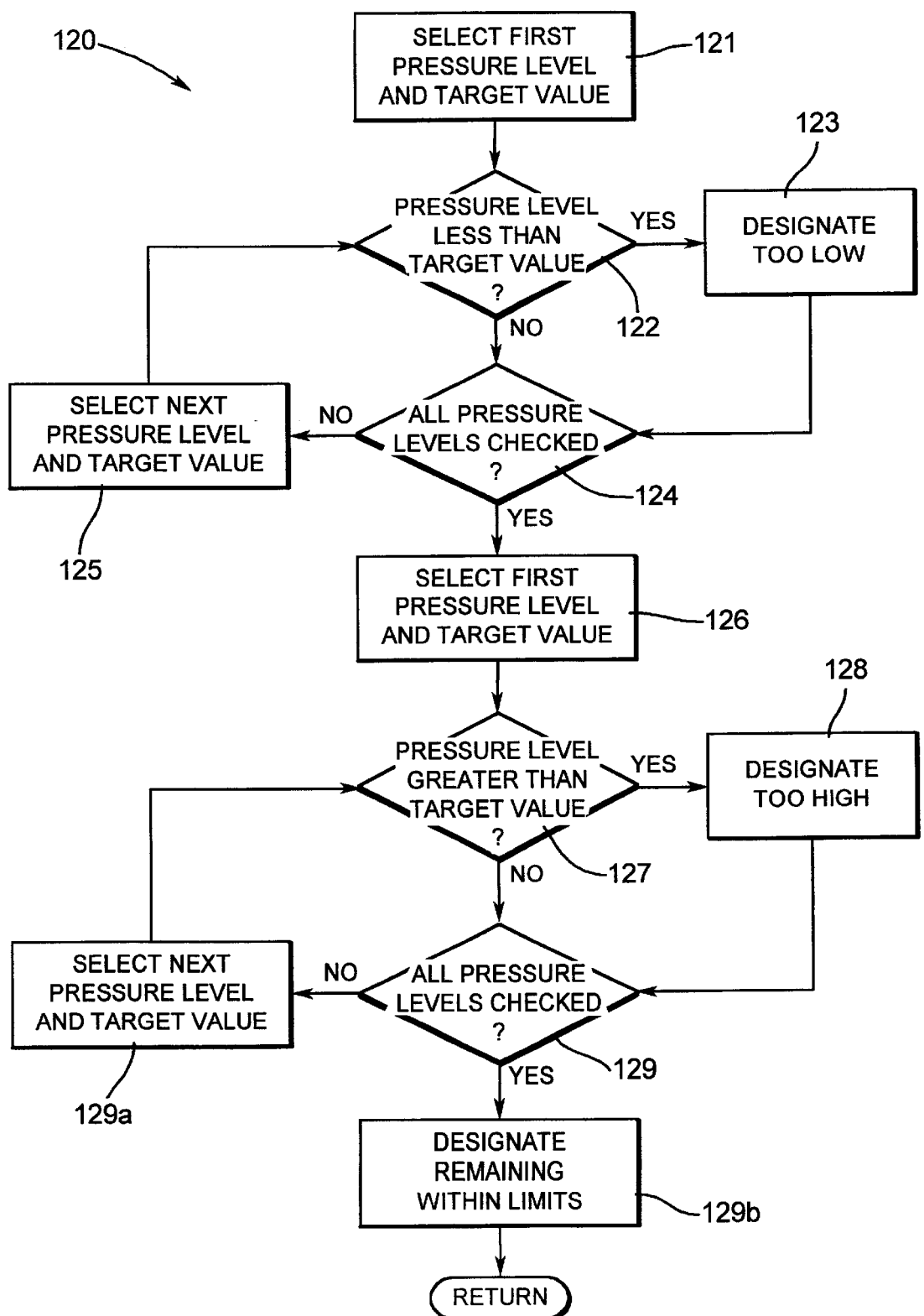
FIG. 5 is a detailed flow chart of the steps involved in a second routine of the algorithm illustrated in FIG. 3.

FIG. 5 is a detailed flow chart of the steps involved in the second routine 120 of the algorithm 100 illustrated in FIG. 3, wherein the measured pressure readings from the bladders 20 through 30 are compared with respective target values and, in response to that comparison, are designated as being either (1) Too Low, (2) Too High, or (3) Within Limits. In a first step 121 of the second routine 120, the microprocessor 42 selects the first pressure level (for example, the pressure level corresponding to the magnitude of the pressure in the first bladder 20) stored in memory. At the same time, the microprocessor 42 selects the target value associated with that particular bladder 20. The target value can be a single discrete value or, more preferably, a range of values defined by upper and lower limits about a predetermined center value. The magnitude of the target values associated with each of the bladders 20 through 30 can be stored in the microprocessor 42 at the time of manufacture. Whether or not this is done, it is desirable that the magnitude of the target values be capable of adjustment by the user as desired, such as by using the input device 47.

Next, the second routine 120 enters a step 122 wherein the value of the stored pressure level is compared with the target value associated with that particular bladder 20. Specifically, it is determined if the value of the stored pressure level is less than the target value associated therewith. If the value of the stored pressure level is less than the associated target value, then the second routine 120 branches to a step 123 wherein the bladder 20 is designated as being Too Low. Then, the second routine 120 enters a step 124. If, alternatively, it is determined at the step 122 that the value of the stored pressure level is not less than the associated target value, then the second routine 120 branches directly to the step 124. In either event, it is determined at the step 124 whether the pressure levels of all of the bladders 20 through 30 have been sampled and stored. If not all of the pressure levels of all of the bladders 20 through 30 have been sampled and stored, then the second routine 120 branches from the step 124 to a step 125 wherein the microprocessor 42 selects the next pressure level stored in memory and the target value associated therewith. Then, the second routine 120 moves from the step 125 back to the step 122 wherein the value of the next stored pressure level is compared with the target value associated therewith. This process is repeated until the values of all of the stored pressure levels have been compared with the target values associated therewith. At this point of the second routine 120, none, some, or all of the bladders 20 through 30 may be designated as being Too Low, depending upon the results of the comparisons.

When the values of all of the stored pressure levels have been compared with the target values associated therewith, the second routine 120 branches from the step 124 to a step 126 wherein the microprocessor 42 again selects the first pressure level stored in memory. At the same time, the microprocessor 42 selects the target value is associated with that particular bladder 20. Next, the second routine 120 enters a step 127 wherein the value of the stored pressure level is compared with the target value associated with that particular bladder 20. Specifically, it is determined if the value of the stored pressure level is greater than the target value associated therewith. If the value of the stored pressure level is greater than the associated target value, then the second routine 120 branches to a step 128 wherein the bladder 20 is designated as being Too High. Then, the second routine 120 enters a step 129. If, alternatively, it is determined at the step 127 that the value of the stored pressure level is not greater than the associated target value, then the second routine 120 branches directly to the step 129. In either event, it is determined at the step 129 whether the pressure levels of all of the bladders 20 through 30 have been sampled and stored. If not all of the pressure levels of all of the bladders 20 through 30 have been sampled and stored, then the second routine 120 branches from the step 129 to a step 129a wherein the microprocessor 42 selects the next pressure level stored in memory and the target value associated therewith. Then, the second routine 120 moves from the step 129a back to the step 127 wherein the value of the next stored pressure level is compared with the target value associated therewith. This process is repeated until the values of all of the stored pressure levels have been compared with the target values associated therewith. At this point of the second routine 120, none, some, or all of the bladders 20 through 30 may be designated as being either Too Low of Too High, depending upon the results of the comparisons.

When the values of all of the stored pressure levels have been compared with the target values associated therewith, the second routine 120 branches from the step 129 to a step 129b wherein any of the bladders 20 through 30 that have not already been designated as being either Too Low or Too High are now designated as being Within Limits. Thus, at the conclusion of the second routine 120, each of the bladders 20 through 30 that is currently at a pressure level that is less than the target value associated therewith is designated as being Too Low, each of the bladders 20 through 30 that is currently at a pressure level that is greater than the target value associated therewith is designated as being Too High, and the remaining bladders are designated as being Within Limits. When this occurs, the second routine 120 returns from the step 129b to the algorithm 110 and enters the third routine 130.

Figure 6:
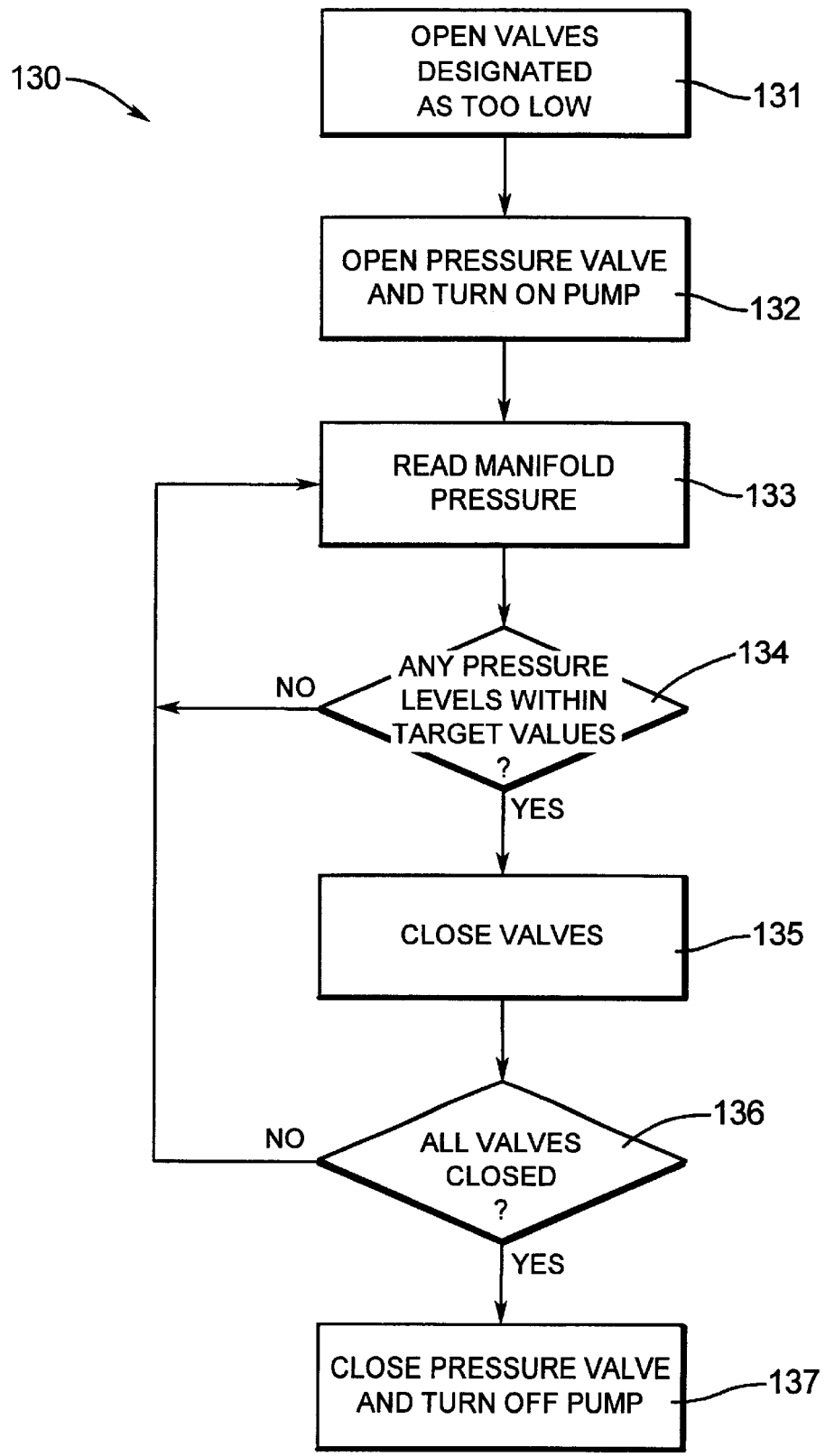
FIG. 6 is a detailed flow chart of the steps involved in a third routine of the algorithm illustrated in FIG. 3.

FIG. 6 is a detailed flow chart of the steps involved in the third routine 130 of the algorithm 100 illustrated in FIG. 3, wherein the bladders 20 through 30 that have been identified as being Too Low are inflated until they have achieved their respective target values. In a first step 131 of the third routine 130, the microprocessor 42 initially causes each of the individual solenoid operated valves 20a through 30a associated with the bladders 20 through 30 that were designated in the manner described above to be Too Low to be opened. As a result, each of the bladders 20 through 30 that are associated with the opened valves 20a through 30a is placed in fluid communication with the manifold 41. Next, the third routine 130 enters a step 132 wherein the pressure valve 45 is moved from the closed position to the opened position, and wherein the pump 46 is energized for operation. As a result, pressurized fluid is introduced within the manifold 41 and, therefore, each of the bladders 20 through 30 that are associated with the opened valves 20a through 30a. Consequently, the pressure levels are increased in the manifold 41 and in each of the bladders 20 through 30 that are associated with the opened valves 20a through 30a.

As this increase in pressure level occurs, the third routine 130 enters a step 133 wherein the pressure in the manifold 41 (as measured by the pressure sensor 43) is sampled by and stored in the microprocessor 42. Thereafter, the third routine 130 enters a step 134 wherein it is determined whether any of the target values for bladders 20 through 30 designated as being Too Low has been achieved, as determined by the pressure in the manifold 41. If none of the target values for bladders 20 through 30 designated as being Too Low have been achieved, then the third routine 130 branches back to the step 133 wherein the pressure in the manifold 41 is again sampled by and stored in the microprocessor 42. However, if any of the target values for bladders 20 through 30 designated as being Too Low have been achieved, then the third routine 130 branches to a step 135 wherein the microprocessor 42 causes individual solenoid operated valves 20a through 30a associated with such bladders 20 through 30 to be closed. As a result, no further increase in the pressure levels therein can occur.

The third routine 130 then enters a step 136 wherein it is determined whether all of the individual solenoid operated valves 20a through 30a that were opened have been closed. If not, the third routine 130 branches back to the step 133 wherein the pressure in the manifold 41 is again sampled by and stored in the microprocessor 42. Thus, the sampling of the pressure levels in the bladders 20 through 30 is repeated until all of the individual solenoid operated valves 20a through 30a that were opened have been closed. When this occurs, the third routine 130 enters a step 137 wherein the pressure valve 45 is moved from the opened position to the closed position, and wherein the pump 46 is de-energized to prevent further operation. Lastly, the third routine 130 returns from the step 137 to the algorithm 110 and enters the fourth routine 140.

Figure 7:
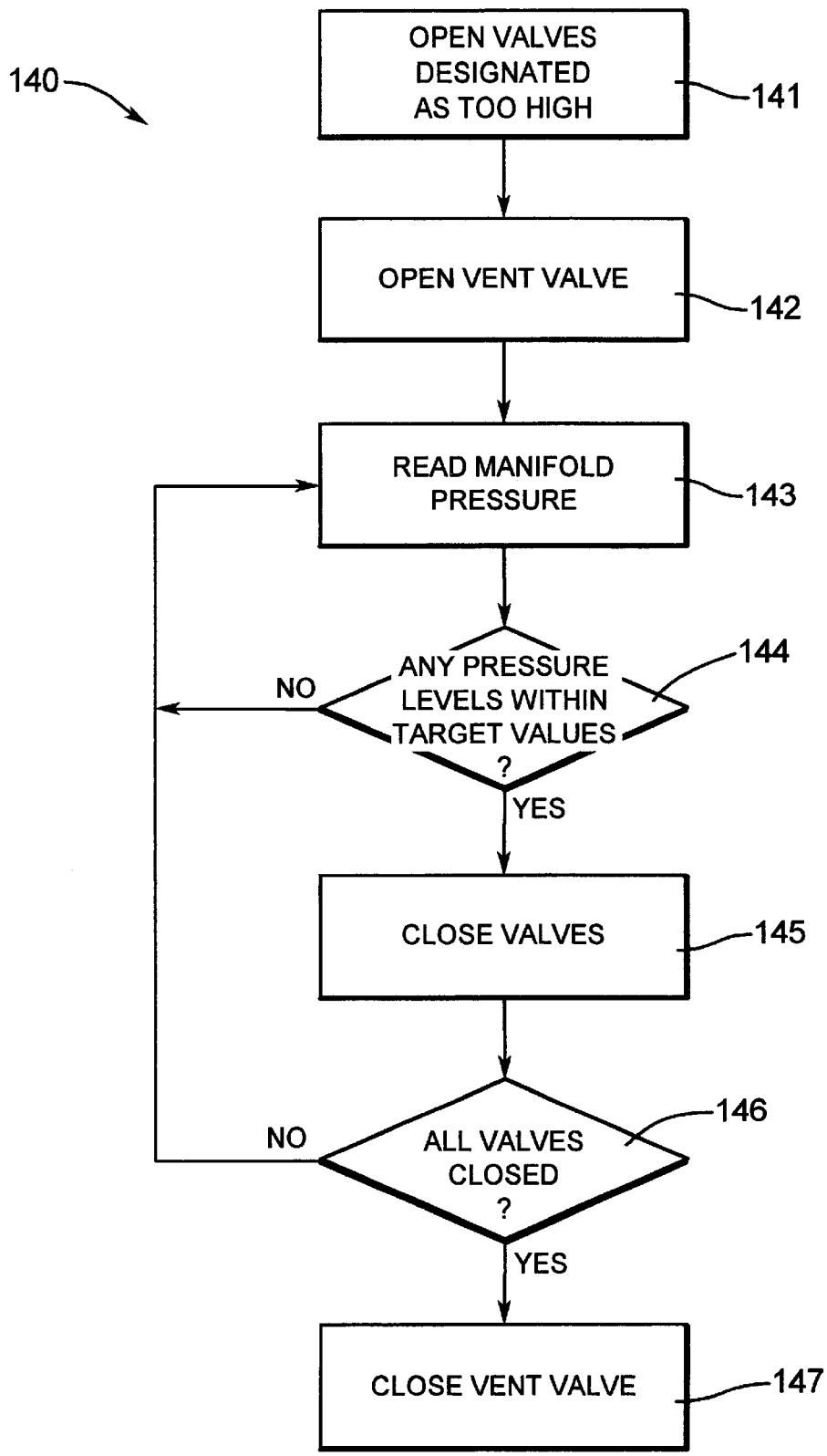
FIG. 7 is a detailed flow chart of the steps involved in a fourth routine of the algorithm illustrated in FIG. 3.

FIG. 7 is a detailed flow chart of the steps involved in the fourth routine 140 of the algorithm 100 illustrated in FIG. 3, wherein the bladders 20 through 30 that have been identified as being Too High are deflated until they have achieved their respective target values. In a first step 141 of the fourth routine 140, the microprocessor 42 initially causes each of the individual solenoid operated valves 20a through 30a associated with the bladders 20 through 30 that were designated in the manner described above to be Too High to be opened. As a result, each of the bladders 20 through 30 that are associated with the opened valves 20a through 30a is placed in fluid communication with the manifold 41. Next, the fourth routine 140 enters a step 142 wherein the vent valve 44 is moved from the closed position to the opened position. As a result, pressurized fluid is vented from the manifold 41 and, therefore, each of the bladders 20 through 30 that are associated with the opened valves 20a through 30a. Consequently, the pressure levels are decreased in the manifold 41 and in each of the bladders 20 through 30 that are associated with the opened valves 20a through 30a.

As this decrease in pressure level occurs, the fourth routine 140 enters a step 143 wherein the pressure in the manifold 41 (as measured by the pressure sensor 43) is sampled by and stored in the microprocessor 42. Thereafter, the fourth routine 140 enters a step 144 wherein it is determined whether any of the target values for bladders 20 through 30 designated as being Too High has been achieved, as determined by the pressure in the manifold 41. If none of the target values for bladders 20 through 30 designated as being Too High have been achieved, then the fourth routine 140 branches back to the step 143 wherein the pressure in the manifold 41 is again sampled by and stored in the microprocessor 42. However, if any of the target values for bladders 20 through 30 designated as being Too High have been achieved, then the fourth routine 140 branches to a step 145 wherein the microprocessor 42 causes individual solenoid operated valves 20a through 30a associated with such bladders 20 through 30 to be closed. As a result, no further decrease in the pressure levels therein can occur.

The fourth routine 140 then enters a step 146 wherein it is determined whether all of the individual solenoid operated valves 20a through 30a that were opened have been closed. If not, the fourth routine 140 branches back to the step 143 wherein the pressure in the manifold 41 is again sampled by and stored in the microprocessor 42. Thus, the sampling of the pressure levels in the bladders 20 through 30 is repeated until all of the individual solenoid operated valves 20*a* through 30*a* that were opened have been closed. When this occurs, the fourth routine 140 enters a step 147 wherein the vent valve 44 is moved from the opened position to the closed position. Lastly, the fourth routine 140 returns from the step 147 to the algorithm 110 and enters the fifth routine 150.

Figure 8:
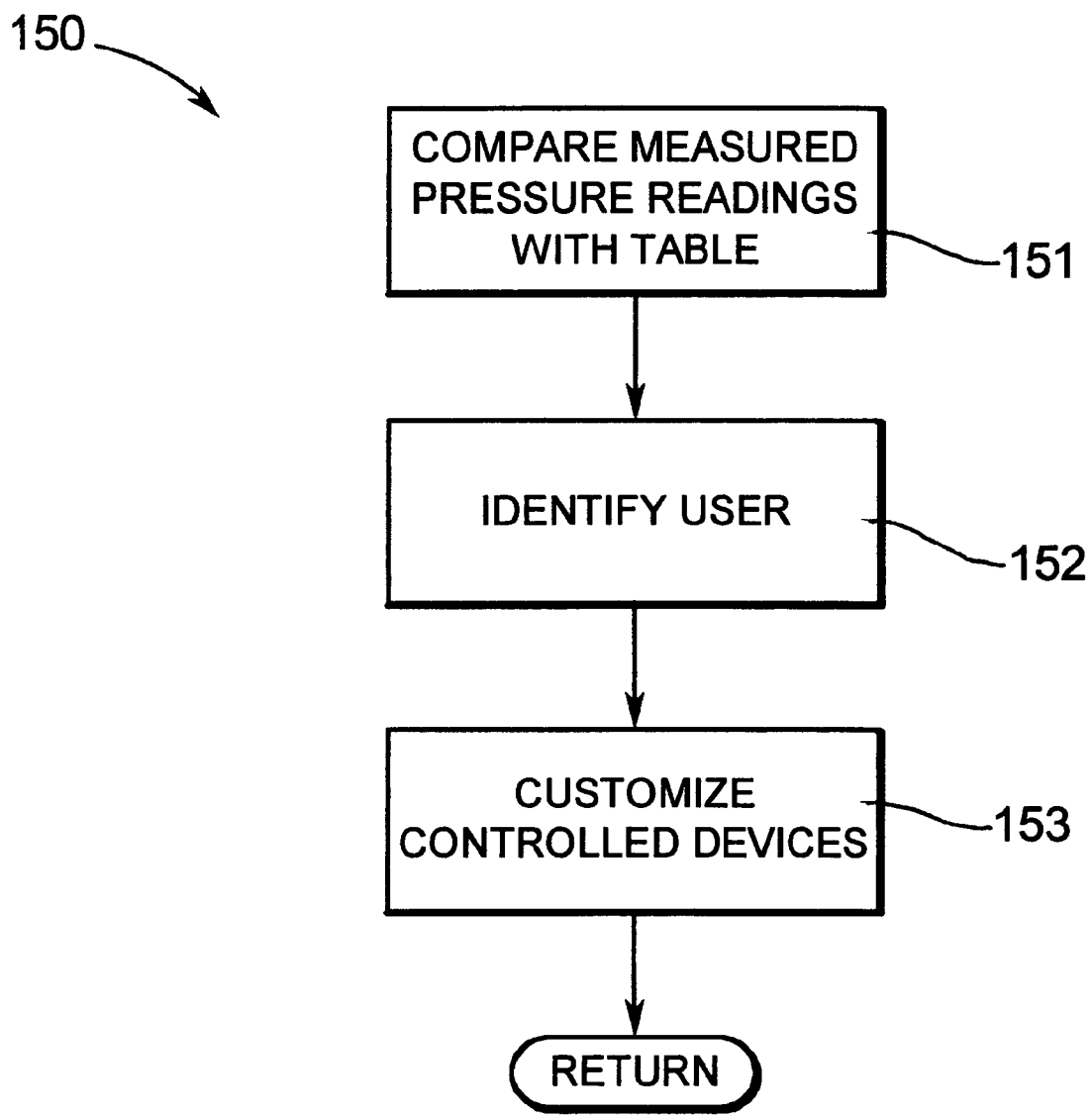
FIG. 8 is a detailed flow chart of the steps involved in a fifth routine of the algorithm illustrated in FIG. 3.

FIG. 8 is a detailed flow chart of the steps involved in the fifth routine 150 of the algorithm 100 illustrated in FIG. 3, wherein the electronic control system 40 identifies the user of the vehicular seat assembly 10 and, in response thereto, customizes the operation of one or more controlled devices in the vehicle. In a first step 151 of the fifth routine 150, the previously measured pressure readings from some or all of the bladders 20 through 30 are compared with a table of values stored in memory. The table of values can consist of a list of a plurality of persons, each of which has one or more pressure readings associated therewith. By comparing the previously measured pressure readings with the pressure readings stored in the table, a correlation can be made as to the identity of the user of the vehicular seat assembly 10, as shown in step 152. This comparison and correlation can be made using any conventional algorithm.

The table of values stored in memory also includes settings for one or more of the controlled devices 48 that are customized to the particular user of the vehicular seat assembly 10. Thus, having identified the user in step 152, the fifth routine 150 next enters a step 153 wherein electrical signals are generated from the microprocessor 42 to each of the controlled devices 48. In response to such signals, the controlled devices 48 are customized to the particular user of the vehicular seat assembly 10. Then, the fifth routine 150 returns to the algorithm 100 and enters the sixth routine 160. As discussed above, the sixth routine 160 causes the electronic control system 40 to enter an inactive mode wherein no action occurs for a predetermined length of time. This predetermined length of time may be set as desired, such as for approximately two minutes. When the predetermined length of time expires, the algorithm 100 branches back to the first routine 110 discussed above, wherein the entire cycle is repeated.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of operating a variable support mechanism in a vehicle having a controlled device, the variable support mechanism including a support mechanism including a plurality of bladders having respective valves connected to a manifold and an electronic control system for selectively inflating and deflating the bladders, said method comprising the steps of:

(a) measuring a magnitude of a pressure in each of the bladders;

(b) associating first and second users with respective measured pressures from each of the bladders;

(c) comparing the measured pressures from each of the bladders with respective target values;

(d) adjusting the pressures in each of the bladders such that the measured values achieve the target values;

(e) identifying the first or second user of the variable support mechanism based upon the measured pressures in each of the bladders; and (f) controlling the operation of the controlled device in response to the identity of the user of the variable support mechanism.

2. The method defined in claim 1 wherein said step (d) is performed by comparing the measured pressures from the bladders with a table of predetermined values that are correlated with the identity of the user.

3. The method defined in claim 1 wherein said step (e) is performed by controlling the operation of an air bag assembly.

4. The method defined in claim 1 wherein said step (e) is performed by controlling the operation of a seat track positioning mechanism.

5. The method defined in claim 1 wherein said step (e) is performed by controlling the operation of a tilt mechanism for adjusting the position of a back portion of the vehicular seat assembly relative to the seat portion.

6. The method defined in claim 1 wherein said step (e) is performed by controlling the operation of a radio.

7. The method defined in claim 1 wherein said step (e) is performed by controlling the operation of a climate control.

8. The method defined in claim 1 wherein said step (e) is performed by controlling the operation of a mirror positioning mechanism.

* * * * *